Patented June 12, 1934

1,962,157

UNITED STATES PATENT OFFICE 1,962,157

DERIVATIVE OF CELLULOSE SOLVENT AND METHOD OF EMPLOYING THE SAME

George W. Seymour, Cumberland, Md., assignor to Celanese Corporation of America, a corporation of Delaware No Drawing. Application August 23, 1932, Serial No. 630,063

21 Claims. (Cl. 134—79)

This invention relates to solvents for cellulose acetate and other derivatives of cellulose and relates to methods and compositions wherein such solvent is employed.

An object of my invention is to produce a new solvent for cellulose acetate or other derivatives of cellulose. Another object of my invention is to employ the formals of hydroxy carboxylic acids as solvents for cellulose acetate or other organic derivatives of cellulose in various processes and for various compositions. Other objects of this invention will appear from the following detailed description.

As is well known, the number of substances that are solvents for cellulose acetate, especially the acetone-soluble type of cellulose acetate, is very limited. Because of the small range of these solvents, it is often difficult and even impossible to find a solvent that meets with the particular requirements of a given problem, such as boiling point, compatibility of mutual solubility with other solvents, resins or other ingredients present in the cellulose acetate composition in which it is employed, cheapness, availability, etc. This is particularly true in the case of high or medium boiling solvents for cellulose acetate.

I have found that the formals of the hydroxy carboxylic acids are excellent solvents for cellulose acetate, particularly the acetone-soluble cellulose acetate, and other organic derivatives of cellulose, and may be employed in all compositions and processes wherein cellulose acetate is to be dissolved.

These formals may be prepared by the condensation of formaldehyde, formalin, trihydroxymethylene or paraformaldehyde with the hydroxy carboxylic acids in the presence of an acidic catalyst such as ferric chloride, hydrochloric acid, sulfuric acid or phosphoric acid. Any suitable hydroxy carboxylic acid may be employed for preparing these formals, examples of which are α-hydroxy-isobutyric acid, α-hydroxy normal butyric acid, glycollic acid, lactic acid, etc.

The following method of preparing the formal of the α-hydroxy-iso-butyric acid is illustrative of the method of preparing these formals.

One (1) molecular proportion of α-hydroxy-iso-butyric acid is mixed with one (1) molecular proportion of paraformaldehyde and a very small amount of sulfuric acid as catalyst is added thereto. The mixture is subjected to slow distillation. The major portion of the distillate comes over at about 110° C. and separates into two layers. The lower layer is dried and redistilled, the distillate being a product boiling at 148 to 149° C. and having the probable formula

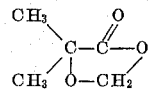

As stated, these formals may be used wherever it is desired to dissolve partially or wholly derivatives of cellulose, such as cellulose nitrate but particularly the organic derivatives of cellulose such as organic esters of cellulose and cellulose ethers. Examples of organic esters of cellulose being cellulose acetate, cellulose formate, cellulose butyrate, while examples of cellulose ethers are ethyl cellulose, methyl cellulose and benzyl cellulose.

A few of the many instances of the use of these formals will be given.

These formals may be employed alone or in conjunction with low boiling, medium, or high boiling solvents, resins both natural and synthetic, plasticizers or other desired ingredients to prepare coating compositions or dopes containing cellulose acetate or other organic derivatives of cellulose, which coating compositions may be employed for coating fabrics, wood and the like, or as lacquers containing suitable natural or synthetic resins, to be applied to metallic or other smooth surfaces. Dopes containing the cellulose acetate dissolved in a solvent comprising these formals may be cast onto smooth surfaces such as film bands, wheels and the like, to form upon evaporation of the solvent, films which may be used for photographic purposes, or thin foils to be employed as transparent wrappings for packages of foodstuffs, tobacco products and other articles of commerce.

Plastic compositions containing organic derivatives of cellulose, plasticizers and other desired ingredients may be made by the use of these formals as at least part of the solvent during the kneading of the mass and subsequent working up of the same on heated malaxating rolls.

If desired besides the formals, other solvents may be used in addition thereto, such as low boiling solvents like acetone, ethylene dichloride and the like, and medium and/or high boiling solvents such as ethyl acetate, ethyl lactate, tetrachlorethane or diacetone alcohol. Examples of plasticizers for cellulose acetate are diphenylol propane, triacetin, dibutyl tartrate, diethyl phthalate, monomethylene xylene sulfonamid, triphenyl phosphate, etc.

It is to be understood that the foregoing description is given merely by way of illustration and that many variations may be made therein without departing from the spirit of my invention.

The term "formal of an aliphatic hydroxy carboxylic acid" and like terms, as used hereinafter in the claims, are to be construed as covering only those substances which may be regarded as formed by the condensation of formaldehyde or compounds yielding formaldehyde with an aliphatic hydroxy carboxylic acid to yield cyclic compounds containing the group

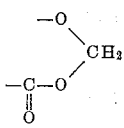

linked with one or more carbon atoms to form the ring.

Having described my invention, what I desire to secure by Letters Patent is:

1. The method of at least partially dissolving a derivative of cellulose comprising contacting the derivative of cellulose with a formal of an aliphatic hydroxy carboxylic acid.

2. The method of at least partially dissolving cellulose acetate comprising contacting the cellulose acetate with a formal of an aliphatic hydroxy carboxylic acid.

3. The method of at least partially dissolving a derivative of cellulose comprising contacting the derivative of cellulose with a formal of an aliphatic α-hydroxy carboxylic acid.

4. The method of at least partially dissolving cellulose acetate comprising contacting the cellulose acetate with a formal of an aliphatic α-hydroxy carboxylic acid.

5. The method of at least partially dissolving a derivative of cellulose comprising contacting the derivative of cellulose with a formal of a hydroxy butyric acid.

6. The method of at least partially dissolving cellulose acetate comprising contacting the cellulose acetate with a formal of a hydroxy butyric acid.

7. The method of at least partially dissolving a derivative of cellulose comprising contacting the derivative of cellulose with the formal of α-hydroxy iso butyric acid.

8. The method of at least partially dissolving cellulose acetate comprising contacting the cellulose acetate with the formal of α-hydroxy iso butyric acid.

9. A composition of matter comprising a derivative of cellulose and a formal of an aliphatic hydroxy carboxylic acid.

10. A composition of matter comprising cellulose acetate and a formal of an aliphatic hydroxy carboxylic acid.

11. A composition of matter comprising cellulose acetate and a formal of a hydroxy butyric acid.

12. A composition of matter comprising cellulose acetate and a formal of an aliphatic α-hydroxy carboxylic acid.

13. A composition of matter comprising cellulose acetate and a formal of α-hydroxy iso butyric acid.

14. A composition of matter comprising a derivative of cellulose dissolved in a solvent comprising a formal of an aliphatic hydroxy carboxylic acid.

15. A composition of matter comprising cellulose acetate dissolved in a solvent comprising a formal of an aliphatic hydroxy carboxylic acid.

16. A composition of matter comprising a derivative of cellulose dissolved in a solvent comprising a formal of an aliphatic α-hydroxy carboxylic acid.

17. A composition of matter comprising cellulose acetate dissolved in a solvent comprising a formal of an aliphatic α-hydroxy carboxylic acid.

18. A composition of matter comprising a derivative of cellulose dissolved in a solvent comprising a formal of hydroxy butyric acid.

19. A composition of matter comprising cellulose acetate dissolved in a solvent comprising a formal of hydroxy butyric acid.

20. A composition of matter comprising a derivative of cellulose dissolved in a solvent comprising a formal of α-hydroxy iso butyric acid.

21. A composition of matter comprising cellulose acetate dissolved in a solvent comprising a formal of α-hydroxy iso butyric acid.

GEORGE W. SEYMOUR.